US008889297B2

(12) United States Patent
Chung et al.

(10) Patent No.: US 8,889,297 B2
(45) Date of Patent: Nov. 18, 2014

(54) NANOCOMPOSITE CATHODE ACTIVE MATERIAL FOR LITHIUM SECONDARY BATTERIES, METHOD FOR PREPARING THE SAME AND LITHIUM SECONDARY BATTERIES COMPRISING THE SAME

(71) Applicant: Korea Institute of Science and Technology, Seoul (KR)

(72) Inventors: Kyung Yoon Chung, Seoul (KR); Dieky Susanto, Seoul (KR); Won Young Chang, Seoul (KR); Byung Won Cho, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 13/738,044

(22) Filed: Jan. 10, 2013

(65) Prior Publication Data
US 2014/0099552 A1 Apr. 10, 2014

(30) Foreign Application Priority Data
Oct. 5, 2012 (KR) .................. 10-2012-0110767

(51) Int. Cl.
*H01M 4/13* (2010.01)
*H01M 4/50* (2010.01)

(52) U.S. Cl.
USPC ............... 429/224; 429/218.1; 252/182.1

(58) Field of Classification Search
None
See application file for complete search history.

(56) References Cited

U.S. PATENT DOCUMENTS

2008/0113267 A1* 5/2008 Jouanneau et al. ........... 429/224

FOREIGN PATENT DOCUMENTS

| JP | 01-294364 A | 11/1989 |
|---|---|---|
| JP | 11-307094 A | 11/1999 |
| KR | 1020090091217 A | 8/2009 |

OTHER PUBLICATIONS

Jisuk Kim et al; "Controlled Nanoparticle Metal Phosphates (Metal = Al, Fe, and Sr) Coatings on LiCoO2 Cathode Materials", Journal of electrochemical Society, vol. 152(6), pp. A1142-A1148; Availabe electronically May 5, 2005 LiCoO2.

* cited by examiner

*Primary Examiner* — Cynthia K. Walls
(74) *Attorney, Agent, or Firm* — Ladas & Parry LLP

(57) ABSTRACT

The present disclosure relates to a nanocomposite cathode active material for a lithium secondary battery, a method for preparing same, and a lithium secondary battery including same. More particularly, the present disclosure relates to a nanocomposite cathode active material for a lithium secondary battery including: a core including $LiMn_2O_4$; and $LiMn(PO_3)_3$ distributed on the surface of the core. In accordance with the present disclosure, the time and cost for manufacturing a lithium secondary battery can be reduced and the manufactured lithium secondary battery has superior electrochemical properties.

11 Claims, 5 Drawing Sheets

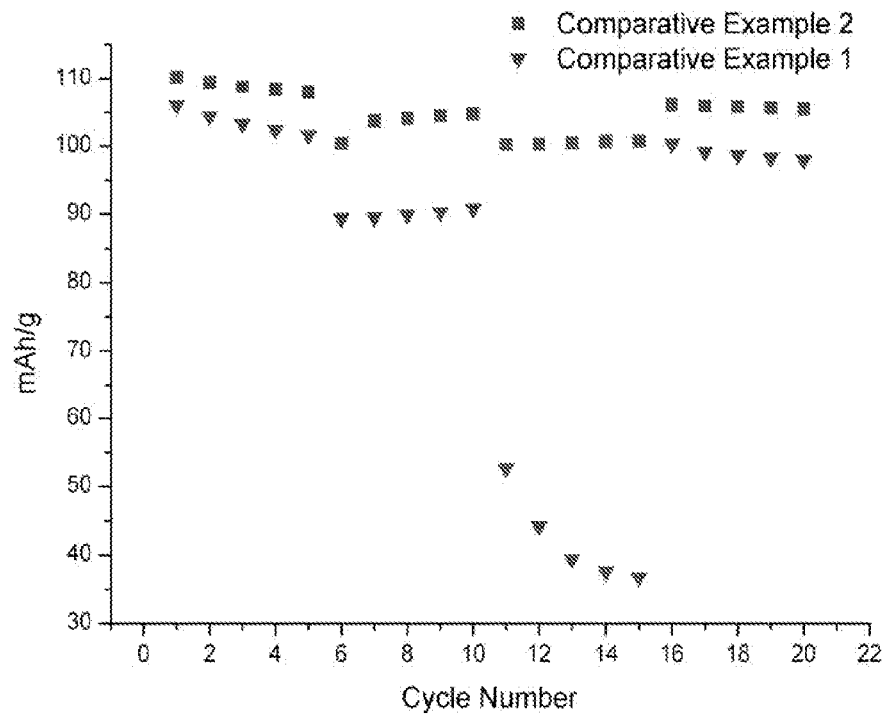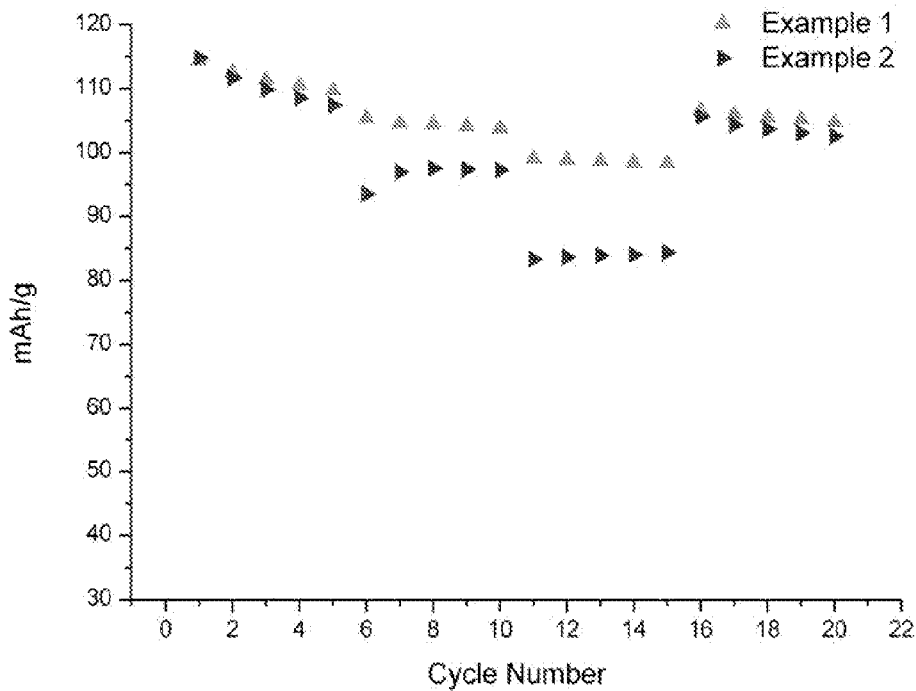

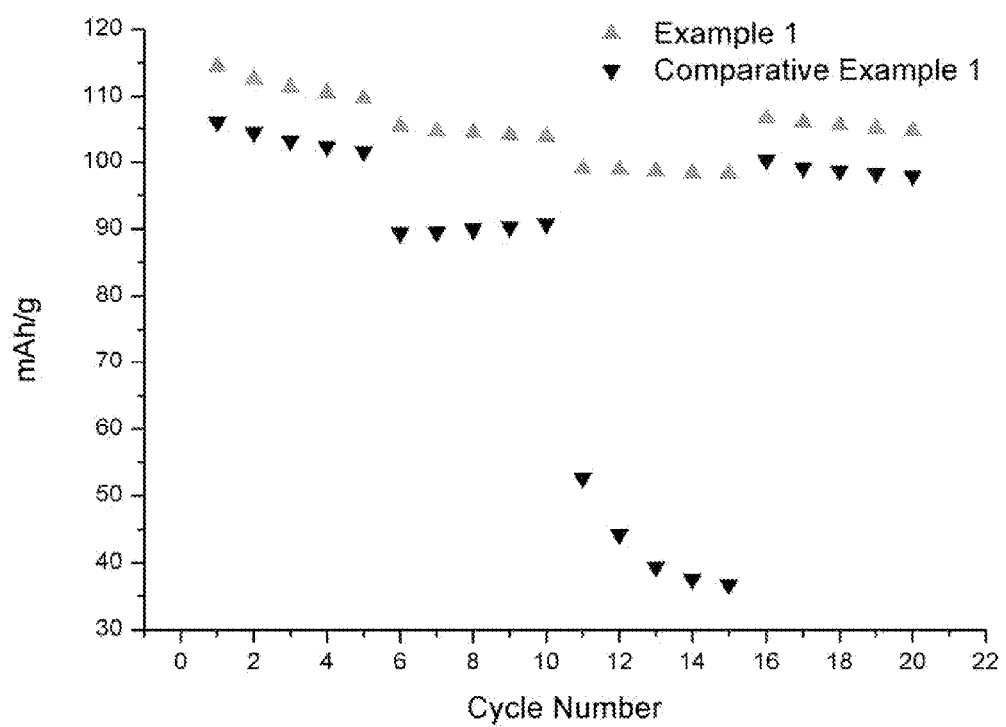

NANOCOMPOSITE CATHODE ACTIVE MATERIAL FOR LITHIUM SECONDARY BATTERIES, METHOD FOR PREPARING THE SAME AND LITHIUM SECONDARY BATTERIES COMPRISING THE SAME

CROSS-REFERENCE TO RELATED APPLICATIONS

This application claims priority under 35 U.S.C. §119 to Korean Patent Application No. 10-2012-0110767 filed on Oct. 5, 2012, in the Korean Intellectual Property Office, the disclosure of which is incorporated herein by reference in its entirety.

TECHNICAL FIELD

The present disclosure relates to a nanocomposite cathode active material for a lithium secondary battery prepared by a solid-state method with short sintering time, a method for preparing the same and a lithium secondary battery including the same.

BACKGROUND

Recently, demand on lithium secondary batteries with high energy density is increasing rapidly and researches are ongoing on their performance from various aspects. A lithium secondary battery basically consists of a positive electrode or cathode, a negative electrode or anode, and an electrolyte and a separator provided between the two electrodes. For the cathode and the anode, use is made of a slurry prepared by dispersing and mixing an active material, a conductive material, a binding agent and, optionally, a plasticizer in a dispersion medium, which is applied on a current collector such as metal foil, metal mesh, etc. As an active material applied to the cathode, lithium-transition metal oxide complexes such as a cobalt-based oxide complex ($Li_{1-x}CoO_2$), a nickel-based oxide complex ($Li_{1-x}NiO_2$), a manganese-based oxide complex ($Li_{1-x}Mn_2O_4$), etc. are widely used.

The lithium oxide complexes used as the positive electrode material of a lithium secondary battery are generally prepared by mixing a compound serving as the major component of the positive electrode material for a lithium secondary battery (e.g., carbonate or oxide of Co, Ni, Mn, etc.) with a lithium compound (e.g., lithium carbonate) and heat-treating the mixture.

For example, Japanese Patent Publication No. H01-294364 discloses a method for preparing a lithium oxide complex, comprising saturating an aqueous solution of chloride of Ni and Co with carbon dioxide gas and adding an aqueous solution of sodium bicarbonate to coprecipitate carbonate of Ni and Co, washing the resulting precipitate with water and drying at 140° C. in the presence of argon gas, and mixing the resultant with lithium carbonate and heating in the air.

And, Japanese Patent Publication No. H11-307094 discloses a method for preparing a lithium oxide complex, comprising adding an aqueous solution of sulfate of elemental components except for lithium and an aqueous solution of ammonium bicarbonate to which a small amount of ammonia slowly to a reaction tank, inducing substantially uniform crystal growth in the shape of concentric sphere while maintaining the pH of the mixture solution in neutral region, and mixing the resultant carbonate complex with lithium hydroxide and calcinating under oxygen gas atmosphere.

At present, the materials used for the electrodes of the lithium secondary battery are generally prepared by the solid-state method. However, since this method involves physical mixing and pulverization processes, repeated sintering and pulverization are required to ensure excellent electrochemical properties and superior crystallinity. Accordingly, a lot of time and cost are spent for the associated processes. Although time and cost can be saved by decreasing the sintering time, in this case, the electrochemical properties of the cathode active material are severely deteriorated and electrochemical performance of the cathode active material becomes poor.

Thus, the need on a cathode active material for a lithium secondary battery having superior electrochemical properties that can be prepared in short time at low cost, without requiring repeated sintering and pulverization processes, is increasing.

SUMMARY

The present disclosure is directed to providing a nanocomposite cathode active material for a lithium secondary battery having superior electrochemical properties that can be sintered in short time, and thus capable of reducing time and cost for preparation, a method for preparing same, and a lithium secondary battery including same.

In one general aspect, there is provided a nanocomposite cathode active material for a lithium secondary battery including: a core including $LiMn_2O_4$; and $LiMn(PO_3)_3$ distributed on the surface of the core.

In an exemplary embodiment of the present disclosure, the $LiMn(PO_3)_3$ may be included in an amount of 0.01-0.1 mole per 1 mole of the $LiMn_2O_4$.

In another general aspect, there is provided a method for preparing a nanocomposite cathode active material for a lithium secondary battery, including:

1) adding a phosphate to a cathode active material precursor mixture;
2) wet mixing the resulting mixture;
3) drying and pulverizing the mixture; and
4) heating and then cooling the pulverized mixture.

In an exemplary embodiment of the present disclosure, the cathode active material precursor mixture may include a compound selected from a group consisting of $MnO_2$, $MnCO_3$, $MnC_2O_4$ and a mixture thereof as a manganese precursor and a compound selected from a group consisting of $Li_2CO_3$, $CH_3COOLi$, $LiOH$ and a mixture thereof as a lithium precursor.

In another exemplary embodiment of the present disclosure, the phosphate may be ammonium phosphate dibasic.

In another exemplary embodiment of the present disclosure, the manganese precursor may be included in an amount of 190-200 moles and the lithium precursor may be included in an amount of 100-110 moles, per 1 mole of the phosphate.

In another exemplary embodiment of the present disclosure, a solvent selected from a group consisting of anhydrous ethyl alcohol, acetone, distilled water and a mixture thereof may be used in the wet mixing in the step 2).

In another exemplary embodiment of the present disclosure, the drying in the step 3) may be performed at 80-100° C. for 12-24 hours.

In another exemplary embodiment of the present disclosure, the mixture pulverized in the step 3) may have an average particle size of 10-100 nm.

In another exemplary embodiment of the present disclosure, the heating drying in the step 4) may be performed at 800-900° C. for 7-24 hours.

In another exemplary embodiment of the present disclosure, the heating and cooling in the step 4) may be performed at a heating or cooling rate of 5-10° C./min.

In another general aspect, there is provided a lithium secondary battery including the nanocomposite cathode active material for a lithium secondary battery.

In accordance with the present disclosure, the time and cost for manufacturing a lithium secondary battery can be reduced and the manufactured lithium secondary battery has superior electrochemical properties.

BRIEF DESCRIPTION OF THE DRAWINGS

The above and other objects, features and advantages of the present disclosure will become apparent from the following description of certain exemplary embodiments given in conjunction with the accompanying drawings, in which:

FIG. 6 shows a result of measuring charge-discharge characteristics and cycle performance of cathode active materials prepared in Comparative Example 1 and Comparative Example 2;

FIG. 7 shows a result of measuring charge-discharge characteristics and cycle performance of nanocomposite cathode active materials prepared in Example 1 and Example 2; and FIG. 8 compares a result of measuring charge-discharge characteristics and cycle performance of cathode active materials prepared in Example 1 and Comparative Example 1.

DETAILED DESCRIPTION OF EMBODIMENTS

Figure 1:
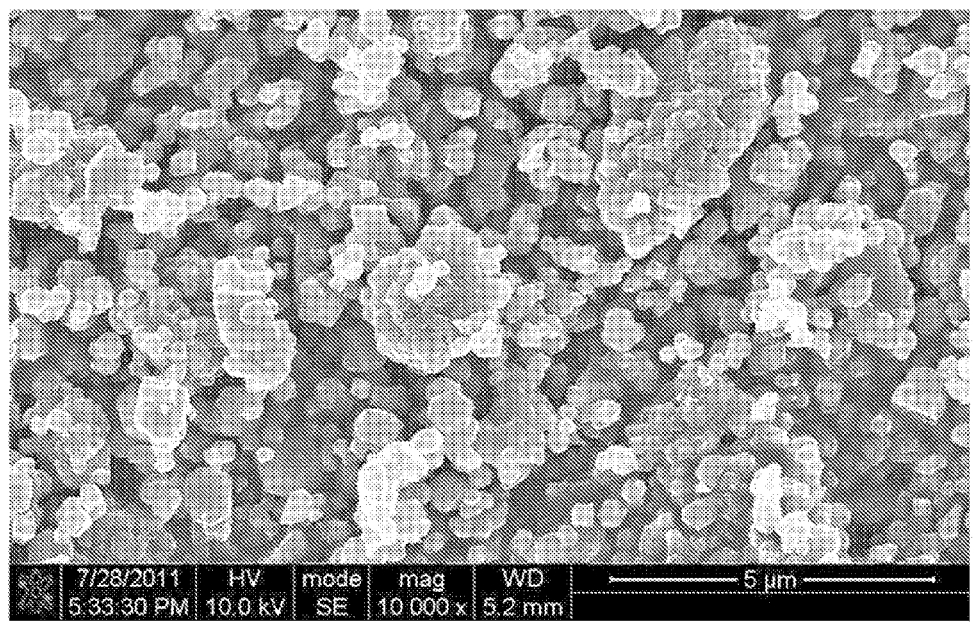
FIG. 1 is a scanning electron microscopic (SEM) image of a nanocomposite cathode active material prepared in Example 1.

Hereinafter, exemplary embodiments will be described in detail with reference to the accompanying drawings.

The biggest disadvantage in preparation of a cathode active material by the solid-state method is that a very long sintering time is required. If the sintering time is reduced, crystallinity of the active material worsens, thus deteriorating electrochemical properties of the active material. The inventors of the present disclosure have found out that sintering time can be reduced when a small amount of phosphate is added to a lithium-manganese oxide complex used as a cathode active material of a lithium secondary battery and the resulting oxide complex has superior electrochemical properties in spite of the short sintering time.

Accordingly, the present disclosure provides a nanocomposite cathode active material for a lithium secondary battery comprising: a core comprising $LiMn_2O_4$; and $LiMn(PO_3)_3$ distributed on the surface of the core. With $LiMn_2O_4$ distributed at the core of a particle and $LiMn(PO_3)_3$ distributed on the surface thereof, the nanocomposite cathode active material according to the present disclosure has remarkably improved electrochemical properties. Further, since repeated sintering and pulverization are not required, manufacturing cost can be greatly reduced. Specifically, $LiMn(PO_3)_3$ is distributed on the surface of the active material particle in the form of an island and may be included in an amount of 0.01-0.1 mole per 1 mole of the $LiMn_2O_4$. If the content of $LiMn(PO_3)_3$ is less than 0.01 mole, the desired effect of reduced sintering time and improved electrochemical properties may not be achieved sufficiently. And, if it exceeds 0.1 mole, excess $LiMn(PO_3)_3$ may act as impurity.

The nanocomposite cathode active material according to the present disclosure is prepared by a process comprising: 1) adding a phosphate to a cathode active material precursor mixture; 2) wet mixing the resulting mixture; 3) drying and pulverizing the mixture; and 4) heating and then cooling the pulverized mixture.

The cathode active material precursor mixture comprises a compound selected from a group consisting of $MnO_2$, $MnCO_3$, $MnC_2O_4$ and a mixture thereof as a manganese precursor and a compound selected from a group consisting of $Li_2CO_3$, $CH_3COOLi$, $LiOH$ and a mixture thereof as a lithium precursor. In particular, in the present disclosure, the phosphate is added to the cathode active material precursor mixture in addition to the manganese precursor and the lithium precursor. The phosphate may be ammonium phosphate dibasic.

The manganese precursor may be included in an amount of 190-200 moles and the lithium precursor may be included in an amount of 100-110 moles, per 1 mole of the phosphate.

In the step 2), the cathode active material precursors and the phosphate are mixed by wet mixing. During the wet mixing process, the above-described components are dissolved in a solvent selected form a group consisting of anhydrous ethyl alcohol, acetone, distilled water and a mixture thereof. For more uniform mixing, a mixing aid such as a zirconium ball may be added. The zirconium ball may be added in an amount appropriate for uniform mixing. For example, it may be added in an amount of about 15 times the total weight of the cathode active material precursor. To obtain a uniform mixture, stirring may be performed, for example, at a rate of 350-400 rpm for 3-4 hours, although not being limited thereto.

After the wet mixing is completed in the step 2), the mixture is dried and pulverized. The mixture is dried and pulverized to obtain an intermediate in the form of powder. The drying may be performed, for example, by spray drying, vacuum drying, air drying, drying using an oven, or the like, although not being limited thereto. Specifically, the drying may be performed in an oven maintained at 80-100° C. for 12-24 hours. The resultant obtained after the drying is pulverized into powder with an average particle size of 10-100 nm.

Finally, the powder dried and pulverized in the step 3) is heated and cooled in the step 4) to prepare the nanocomposite cathode active material according to the present disclosure. The condition for the heating and cooling is an important factor to achieve superior electrochemical properties of the nanocomposite according to the present disclosure.

Specifically, the heating in the step 4) may be performed at 800-900° C. for 7-24 hours. The rate of heating to the final heating temperature and that of cooling down to room temperature may be 5-10° C./min. If the heating temperature is too high, oxygen deficiency may occur in $LiMn_2O_4$. And, if the heating temperature is too low, discharge capacity may decrease owing to impurities such as $Li_2Mn_4O_9$. The heating may be performed, for example, under nitrogen gas, argon gas, argon/hydrogen mixture gas or nitrogen/hydrogen mixture gas atmosphere.

The present disclosure further provides a lithium secondary battery comprising the nanocomposite cathode active material for a lithium secondary battery according to the present disclosure. The lithium secondary battery according to the present disclosure comprises ordinary components such as a cathode, an anode, a separator, etc. and, in particular, comprises the above-described nanocomposite as a cathode active material.

EXAMPLES

The examples and experiments will now be described. The following examples and experiments are for illustrative purposes only and not intended to limit the scope of this disclosure.

Example 1

$Li_2CO_3$ (3.74 g), $MnO_2$ (16.14 g) and $(NH_4)_2HPO_4$ (0.12 g) were weighed with a molar ratio of 1.1:2:0.01. These compounds were put in a 500-mL bottle (Nalgene). After adding a zirconium ball (300 g) and anhydrous ethyl alcohol (80 mL), the mixture was stirred at 350 rpm for 3 hours. After the stirring for 3 hours, the resulting solution was dried in an oven of 80° C. overnight to evaporate the anhydrous ethyl alcohol. Then, the resultant gel was pulverized, transferred to an alumina crucible and heat-treated at 820° C. for 7 hours in the air. The resultant was pulverized to obtain a $Li_{1.1}Mn_2O_4$ cathode active material.

Figure 5:
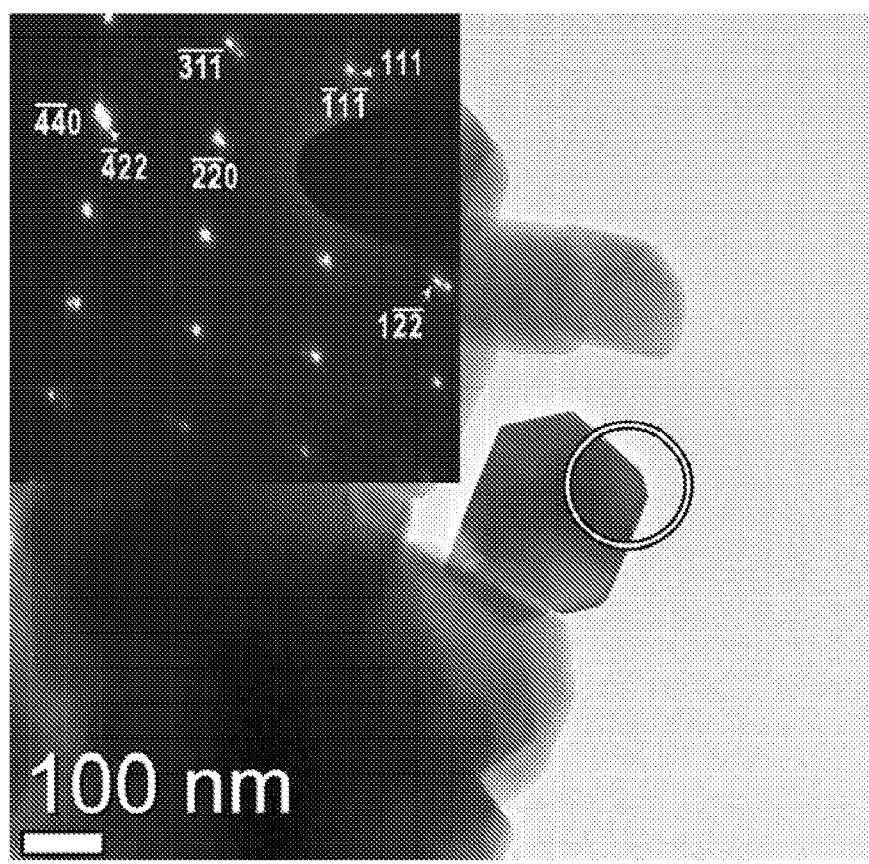
FIG. 5 shows a transmission electron microscopic (TEM) diffraction pattern of a nanocomposite cathode active material prepared in Example 1.

FIG. 1 is a scanning electron microscopic (SEM) image of the prepared cathode active material and FIG. 5 shows a transmission electron microscopic (TEM) diffraction pattern. The existence of $LiMn(PO_3)_3$ was confirmed.

Subsequently, to prepare a lithium secondary battery according to the present disclosure, the $Li_{1.1}Mn_2O_4$ cathode active material (3 g) was mixed with Denka Black™ (a conductive acetylene carbon black material trademarked by Denki Kagaku Kogyo Kabushiki Kaisha, Japan) (0.16 g) and PVDF (Polyvinylidene fluoride) (0.33 g) at a weight ratio of 90:5:5. After adding NMP (N-Methylpyrrolidone), when an appropriate viscosity was obtained, the mixture was cast on an aluminum foil, dried and then rolling-pressed to fabricate a $Li_{1.1}Mn_2O_4$ electrode.

The as-prepared $Li_{1.1}Mn_2O_4$ electrode was assembled with a polypropylene separator and a lithium counter electrode to configure a half-cell of a lithium secondary battery. After injecting a solution of 1 M $LiPF_6$ dissolved in EC:DMC:DEC, charge-discharge characteristics and cycle performance were investigated in the voltage range of 3.0-4.5V, at a current density of C/10 for first 5 cycles, 1 C for next 5 cycles, 4 C for next 5 cycles and C/10 for the last 5 cycles, by the charge-discharge method of applying constant current and constant voltage of 4.5 V for 10 minutes. The result is shown in FIG. 7 and FIG. 8.

Example 2

Figure 2:
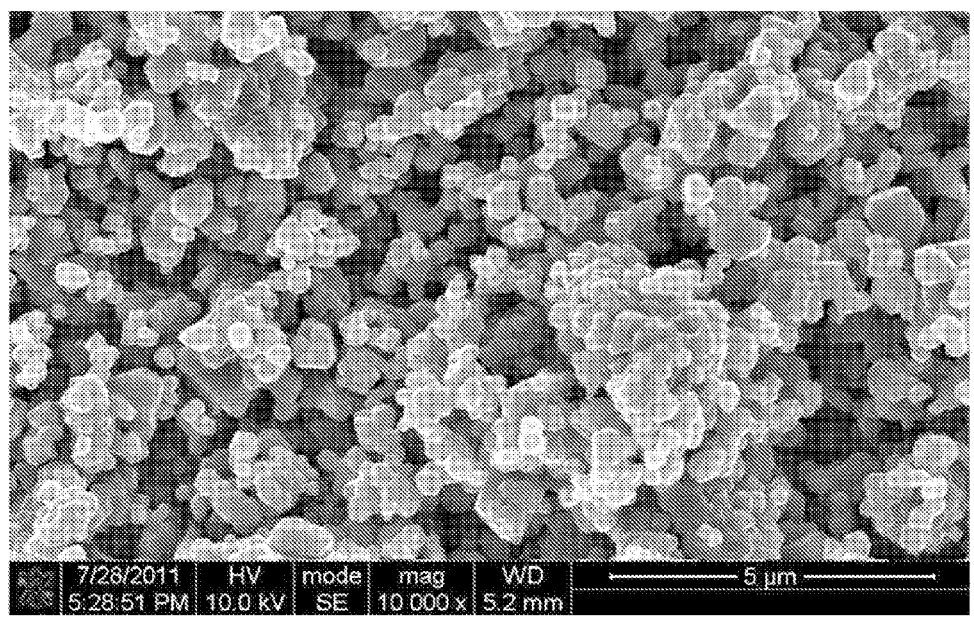
FIG. 2 is a scanning electron microscopic image of a nanocomposite cathode active material prepared in Example 2.

A $Li_{1.1}Mn_2O_4$ cathode active material was prepared in the same manner as in Example 1, except for using 3.71 g of $Li_2CO_3$, 16.04 g of $MnO_2$ and 0.24 g of $(NH_4)_2HPO_4$, such that the molar ratio was 1.1:2:0.02. FIG. 2 is an SEM image of the prepared cathode active material.

Also, charge-discharge characteristics and cycle performance were investigated in the same manner as in Example 1. The result is shown in FIG. 7.

Comparative Example 1

Figure 3:
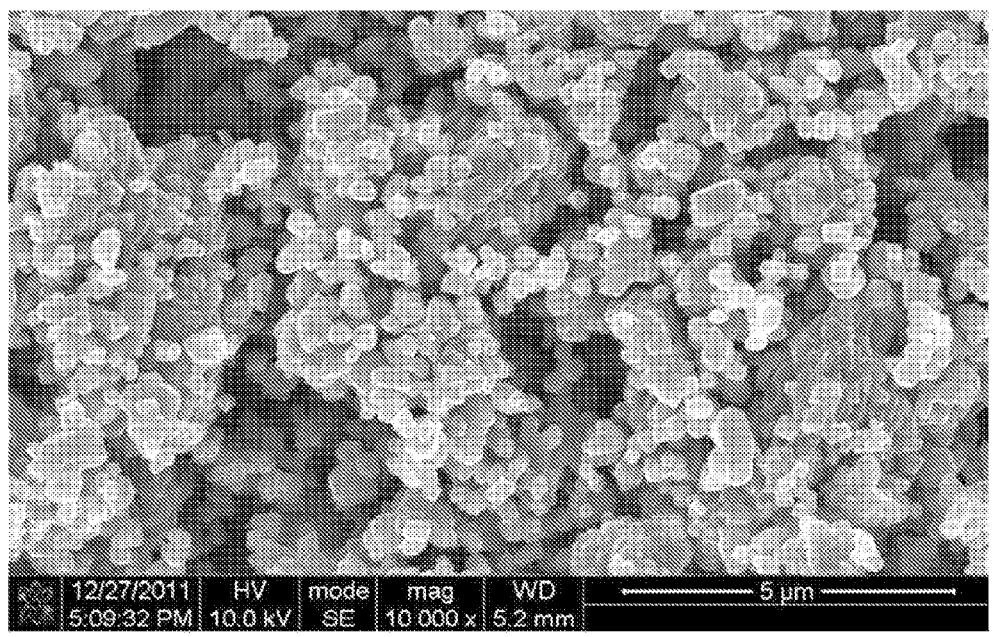
FIG. 3 is a scanning electron microscopic image of a nanocomposite cathode active material prepared in Comparative Example 1.

A $Li_{1.1}Mn_2O_4$ cathode active material was prepared in the same manner as in Example 1, except for using 3.76 g of $Li_2CO_3$ and 16.24 g of $MnO_2$ and not using $(NH_4)_2HPO_4$, such that the molar ratio was 1.1:2. FIG. 3 is an SEM image of the prepared cathode active material.

Also, charge-discharge characteristics and cycle performance were investigated in the same manner as in Example 1. The result is shown in FIG. 6 and FIG. 8.

Comparative Example 2

Figure 4:
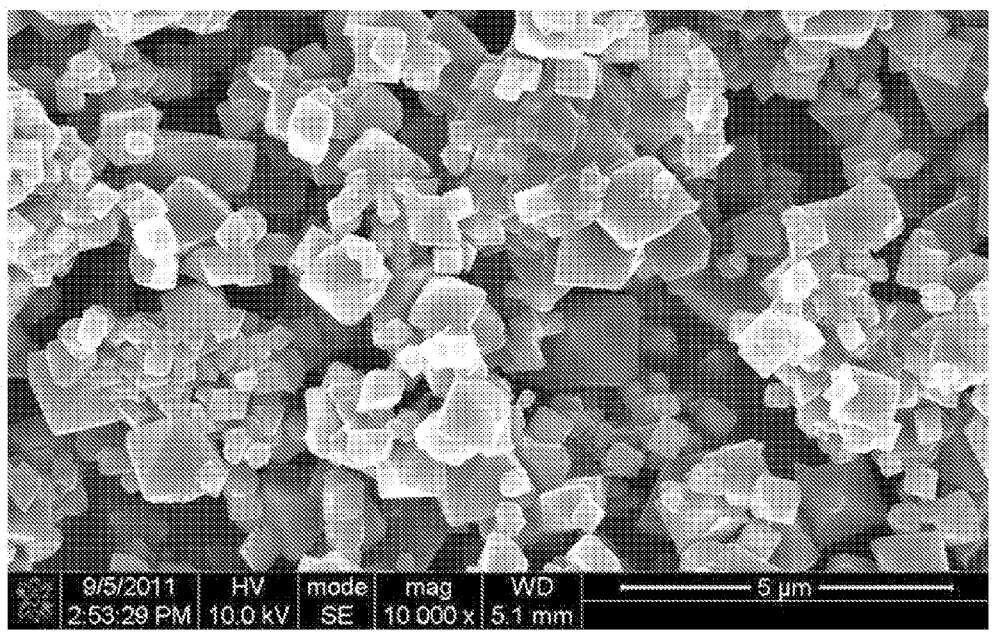
FIG. 4 is a scanning electron microscopic image of a nanocomposite cathode active material prepared in Comparative Example 2.

A $L_{1.1}Mn_2O_4$ cathode active material was prepared in the same manner as in Comparative Example 1, except for increasing the heat-treating time at 820° C. to 24 hours. FIG. 4 is an SEM image of the prepared cathode active material.

Also, charge-discharge characteristics and cycle performance were investigated in the same manner as in Example 1. The result is shown in FIG. 6.

As seen from FIGS. 1-4, the cathode active materials of Examples 1 and 2 have smaller particle size than the cathode active materials of Comparative Examples 1 and 2. And, as seen from FIGS. 6 and 8, the lithium secondary batteries of Examples have better charge-discharge characteristics than those of Comparative Examples. In addition, as seen from FIG. 7, the lithium secondary batteries of Examples show better cycle performance at high C rate than that of Comparative Example 1 to which phosphate was not added and comparable to that of Comparative Example 2 which was prepared with a longer sintering time.

As demonstrated in the foregoing examples, the lithium nanocomposite cathode active material prepared according to the present disclosure can solve the problems of low capacitance and poor electrochemical properties with short sintering time. Consequently, the electrochemical properties of the electrode material including capacitance, life cycle, output characteristics, etc. can be improved and sintering time can be decreased by including $LiMn(PO_3)_3$ on the surface of the core comprising $LiMn_2O_4$.

While the present disclosure has been described with respect to the specific embodiments, it will be apparent to those skilled in the art that various changes and modifications may be made without departing from the spirit and scope of the disclosure as defined in the following claims.

What is claimed is:

1. A nanocomposite cathode active material for a lithium secondary battery comprising: a core comprising $LiMn_2O_4$; and $LiMn(PO_3)_3$ distributed on the surface of the core wherein $LiMn(PO_3)_3$ comprises 0.01-0.1 mole per 1 mole of $LiMn_2O_4$.

2. The nanocomposite cathode active material for a lithium secondary battery according to claim 1, wherein the nanocomposite cathode active material comprises an average particle size of 10-100 nm.

3. A lithium secondary battery comprising the nanocomposite cathode active material for a lithium secondary battery according to claim 1.

4. A cathode active material comprising $LiMn_2O_4$ and $LiMn(PO_3)_3$ in an amount of 0.01-0.1 moles $LiMn(PO_3)_3$ per 1 mole of $LiMn_2O_4$.

5. The cathode active material of claim 4, wherein the $LiMn_2O_4$ comprises a core and the $LiMn(PO_3)_3$ is distributed on a surface of the $LiMn_2O_4$ core.

6. The cathode active material of claim 4, wherein the cathode active material comprises an average particle size of 10-100 nm.

7. A cathode comprising:
$LiMn_2O_4$,
$LiMn(PO_3)_3$,
a carbon black, and a fluoropolymer,
- wherein the $LiMn_2O_4$, $LiMn(PO_3)_3$, carbon black, and fluoropolymer mixed together and roll-pressed to fabricate the cathode, and
- wherein an amount of $LiMn(PO_3)_3$ comprises 0.01-0.1 moles per 1 mole of $LiMn_2O_4$.

8. The cathode of claim 7, wherein the fluoropolymer comprises polyvinylidene fluoride.

9. The cathode of claim 7, wherein the carbon black comprises an acetylene carbon black.

10. The cathode of claim 7, wherein the $LiMn_2O_4$ comprises a core and the $LiMn(PO_3)_3$ is distributed on a surface of the $LiMn_2O_4$ core.

11. The cathode active material of claim 10, wherein the $LiMn_2O_4$ core with the $LiMn(PO_3)_3$ distributed on a surface of the $LiMn_2O_4$ core comprises an average particle size of 10-100 nm.

* * * * *